March 23, 1948.    W. C. CALCOTT    2,438,472
HOSE COUPLING
Filed April 10, 1944    2 Sheets-Sheet 1
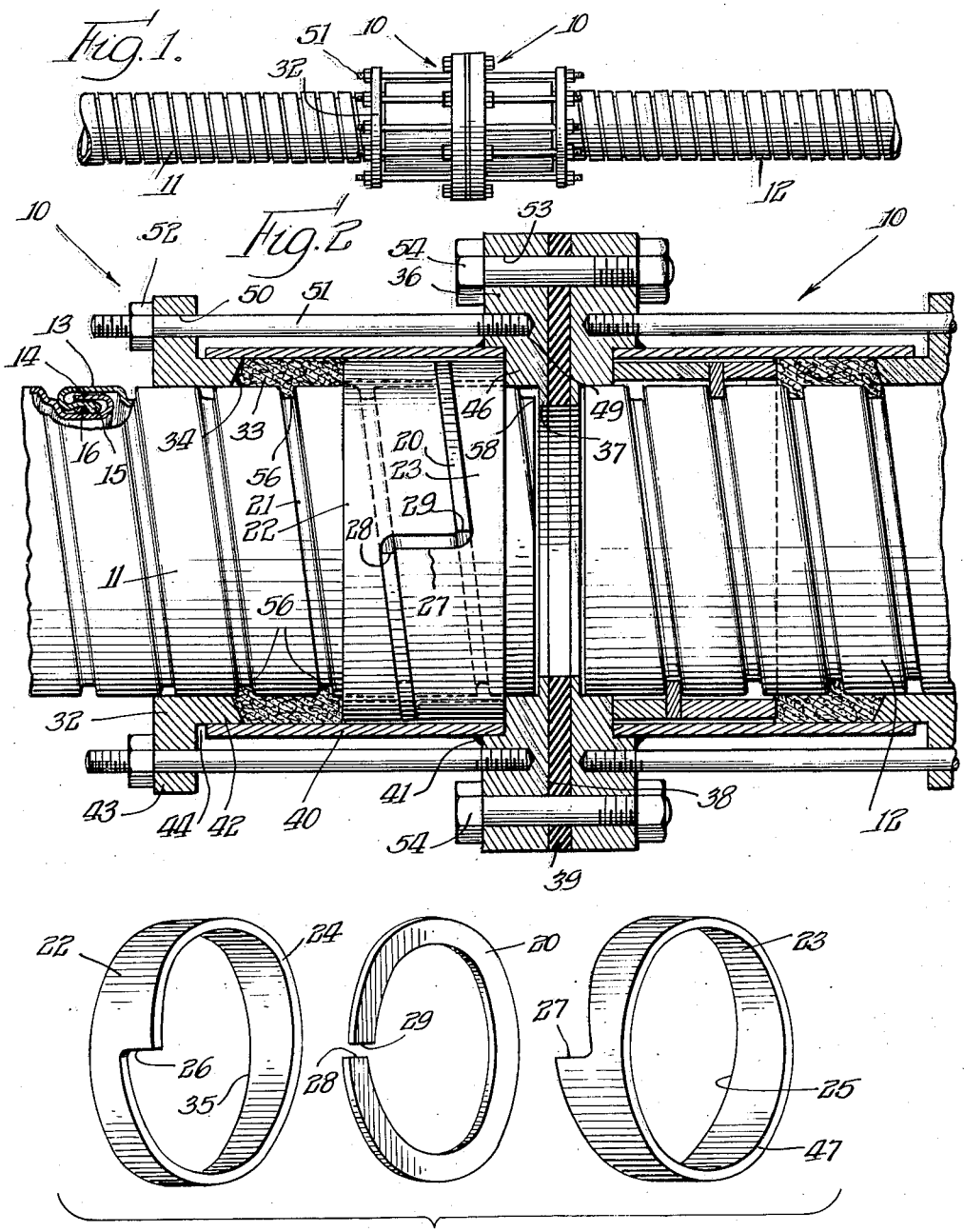
INVENTOR.
Walter C. Calcott
By:- Loftus, Moore, Olson & Trexler
attys March 23, 1948. W. C. CALCOTT 2,438,472
HOSE COUPLING
Filed April 10, 1944 2 Sheets-Sheet 2

INVENTOR.
Walter C. Calcott
By: Loftus Moore
Olson & Trexler
attys.

Patented Mar. 23, 1948

2,438,472

UNITED STATES PATENT OFFICE 2,438,472

HOSE COUPLING

Walter C. Calcott, Maywood, Ill., assignor to Chicago Metal Hose Corporation, Maywood, Ill., a corporation of Illinois Application April 10, 1944, Serial No. 530,328

14 Claims. (Cl. 285—130)

This invention relates to hose coupling structures, particularly adapted for use with hose or tubing of the spiral convoluted type.

It is an object of the invention to provide a hose or tubing coupling of the type stated, of improved construction and operating characteristics. More specifically stated it is an object of the invention to provide a hose coupling for spiral convoluted hose or tubing, wherein the features of mechanical strength and resistance to end thrust, and fluid tightness, are combined in a novel and improved manner.

Further objects of the invention are to provide a coupling structure for spiral convoluted hose which can be readily applied to the hose or tubing without the application of heat or the use of special tools; which is readily adaptable to hose of different sizes, over a wide range; which is economical to construct; and which is wholly efficient and satisfactory in operation.

Various other objects, advantages and features of the invention will be apparent from the following specification when taken in connection with the accompanying drawings wherein certain preferred embodiments are set forth for purposes of illustration.

In the drawings, wherein like reference numerals refer to like parts throughout:

Fig. 1 is a general assembly view of a hose coupling, with its associated hose or tubing, constructed in accordance with and embodying the principles of the invention;

Fig. 2 is a longitudinal sectional view, on an enlarged scale, of a portion of the structure shown in Fig. 1;

Fig. 3 is an exploded view, more particularly showing the details of construction of some of the coupling parts;

Figure 4:
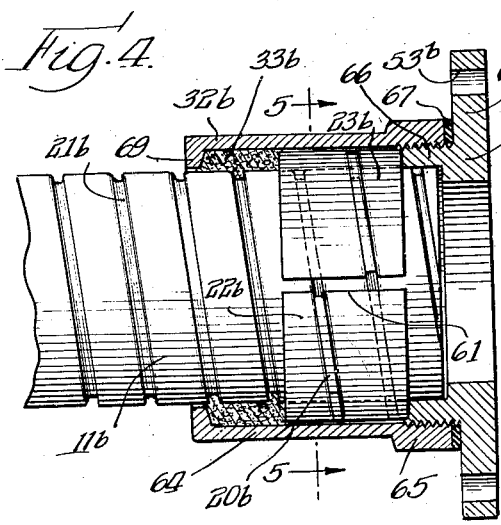
Fig. 4 is a longitudinal sectional view of a coupling structure of modified form, with its associated hose or tubing.

In the drawings the coupling structure of the invention has been illustrated as applied to hose of the spiral strip type, as various features of the structure are particularly adapted for use with this type of hose or tubing. It is to be understood, however, that the invention, in other of its aspects, is adapted for use with other types of tubing such, for example, as spiral convoluted tubing formed from longitudinally seamed or one-piece cylindrical tubing stock.

Referring more particularly to the drawings, and first to the embodiment shown in Figs. 1, 2 and 3, the coupling structures, generally indicated by the numeral 10, are shown as applied for securing the ends of two hose or tubing pieces 11 and 12, of the spiral strip mechanically interlocked type, together in a fluid-tight joint. As is well known in the art, tubing of this type is formed of a spirally wound elongated metal strip such, for example, as indicated at 13 in Fig. 2, the juxtaposed strip edges 14 and 15 being brought into interengaging or interlocked position whereby to provide a flexible tubing structure. Generally a cord or wire of packing, such as indicated at 16, is arranged helically and disposed within the connection at the strip edges, whereby to facilitate the provision of a fluid-tight hose structure. The packing may be metal wire; or may, for example, be asbestos, rubber, or other suitable packing material.

In flexible hose or tubing of this type difficulty is encountered in providing a coupling structure, which can be readily applied to the hose, and without injury thereof, while at the same time providing a mechanically strong as well as fluid-tight coupling joint. Particularly in the case of the larger hose sizes, the coupling is subjected to a considerable end thrust tending to shear the coupling off of the hose end, when the hose is subjected to relatively high internal fluid pressures.

The coupling structure of the present invention comprises a split ring interlocking member 20, best shown in perspective detail in Fig. 3, adapted to be threaded upon and interlocked with the spiral convolutions of the hose, to provide a positive grip mechanical interlock between the hose convolutions and the coupling when the latter is in assembled position. More particularly, the ring 20 is spirally formed of a pitch equal to that of the hose convolutions to which it is to be applied, so that the ring may be threaded onto the hose end, into position as illustrated in Fig. 2 and thus mechanically interlocked with the spiral hose convolutions. The inner diameter of the interlocking ring 20 is substantially the same as the trough diameter of the groove 21 of the tubing so that the ring lies within the groove, the outer diameter of the ring being somewhat greater than the outer diameter of the tubing so as to project radially therefrom a predetermined distance.

This radially projecting portion of the interlocking ring is adapted to be gripped between a pair of anchor or clamp members 22 and 23, also shown in perspective detail in Fig. 3. These anchor members, of annular sleeve-like form, loosely embrace the tubing, and are adapted to be brought into abutting engagement against the opposite side faces of the interlocking member 20. To this end the member 22 is provided with a helical side face 24 for co-mating abutting engagement with one side of the ring 20, whereas the member 23 is similarly provided with a helically shaped side wall face 25, shaped to correspond to engage the opposite side of the ring 20, and corresponding to the pitch thereof. When the parts are in assembled position, as shown in Fig. 2, the stepped portions 26 and 27 of the anchor sleeves are in substantial alignment with the ends 28 and 29 of the interlocking ring.

An auxiliary coupling body member 32, L-shaped in cross section, embraces the hose inwardly of the anchor members, the body member being of such size as to have a sliding fit on the hose. Packing material 33, in the form of an annular sleeve, is interposed between the conical end face 34 of the coupling body member 32, and the annular side wall portion 35 of the anchor sleeve 22.

A main coupling body 36 also embraces the hose with a sliding fit, this body member preferably having an inwardly projecting flange 37 overlying the hose end, and a finished face 38 adapted to receive or abut a gasket 39, of suitable packing material. An annular sleeve member 40, projecting axially of the structure, is suitably secured to the body member 36 as by soldering or welding as indicated at 41. The sleeve member 40 projects over and is adapted to have a sliding fit upon the axial body portion 42 of the auxiliary body member 32, the sleeve member terminating somewhat short of the radial flange portion 43 of the auxiliary body member so as to provide a clearance or adjustment space as indicated at 44. A transverse wall portion 46 of the main coupling body member is adapted to abut the annular wall surface 47, Fig. 3, of the annular member 23.

The main coupling body member is provided with a series of tapped bolt holes, as indicated at 49, in circumferentially spaced relationship, and the flange portion 43 of the auxiliary body member is provided with a series of holes 50 in corresponding circumferential relationship. A series of bolts or studs 51 have their ends threadedly engaged into the holes 49, the bolts being respectively provided at their opposite ends with threaded nuts 52 for adjustably clamping the auxiliary body member 32 and the main body member 36 together. The main body member is also provided with a series of bolt holes 53, in circumferentially spaced relationship, for receiving bolts 54 whereby the coupling structure may be clamped against the gasket 39 and connected with a coupling structure or other end fitting to which it is adapted to be connected.

In assembling the coupling structure upon the hose end, the auxiliary body member 32 is first slipped into position, the packing 33 and the anchor member 22 then being also slipped onto the hose end, into position as shown in Fig. 2. The interlocking ring 20 is then threaded onto the spiral hose convolutions, and the cooperating anchor member 23 brought into abutting position thereagainst. The main coupling body member 36 may then be placed into position, and the studs 51 and nuts 52 applied to clamp the parts together. It will be seen that as the nuts 52 are tightened on the bolts, the auxiliary body member 32 will be propelled toward the main coupling body member, causing the packing 33 to be compressed between the auxiliary body member and the anchor member 22, against the encircling sleeve member 40 and into tight gripping engagement with the outer surface of the hose wall. Additionally, the flexible packing will be forced into the spiral groove 21 of the tubing, as indicated at 56, whereby to provide a tight seal between the packing and the external surface of the hose. Preferably the packing is so arranged that it extends along an appreciable axial surface of the hose wall, as shown in Fig. 2, preferably having a length somewhat in excess of the pitch of the tubing convolutions, whereby to provide an effective seal and prevent fluid from creeping along the hose groove 21 through the packing.

The interlocking ring 20, being mechanically interlocked with the spiral convolutions of the hose, provides a firm anchorage for the coupling structure upon the hose end, preventing the coupling from being sheared or thrust off of the hose end, even under high fluid pressures, and in installations wherein the coupling structure is applied to hose of relatively large diameter. For example, in installations wherein the hose diameter may be eight or ten inches, a size with which the coupling structure of the present invention may be readily used, it will be seen that fluid pressures of perhaps one hundred pounds per square inch within the hose will produce a very considerable end thrust tending to shear the coupling structure off of the end of the tubing. The interlocking ring 20, with the associated anchor members 22 and 23, provide a firm positive mechanical grip of the coupling upon the hose, resisting these shearing forces.

At the same time a fluid-tight seal is provided, notwithstanding the helical groove 21 in the tubing, which tends to promote leakage, and notwithstanding the fact that it is generally impossible to cut a smooth end face upon the hose, for example as indicated at 58. More particularly, fluid tending to escape between the hose end face 58 and the coupling flange portion 37 is blocked from escaping outwardly of the sleeve 40 by the weld or solder joint 41, and is blocked from escaping along the inner surface of the sleeve 40, or along the exterior surface of the hose wall, or along the hose groove 21, by the relatively long compressed packing structure 33. The bolts 51 with their associated adjustment nuts 52 provide a ready means for compressing the packing and assembling the parts in position, and without the application of special tools. The coupling structure is adapted for use with hose over a wide range of sizes, including relatively large sizes. The weld or soldered joint 41 will be formed prior to the assembly of the coupling upon the hose, and it will thus be seen that the assembly may be made without the use of heat such as is likely to destroy the hose packing 16 which, as previously stated, may be asbestos or rubber or other packing material subject to deterioration when subjected to excessive welding heat or the like.

Figure 8:
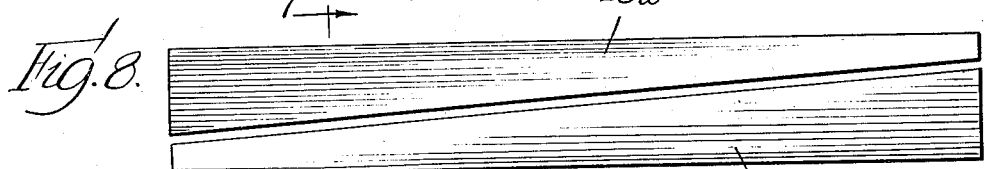
Fig. 8 is a detail illustrative view of the coupling anchor or clamp members, constructed in a modified form.
Figure 9:
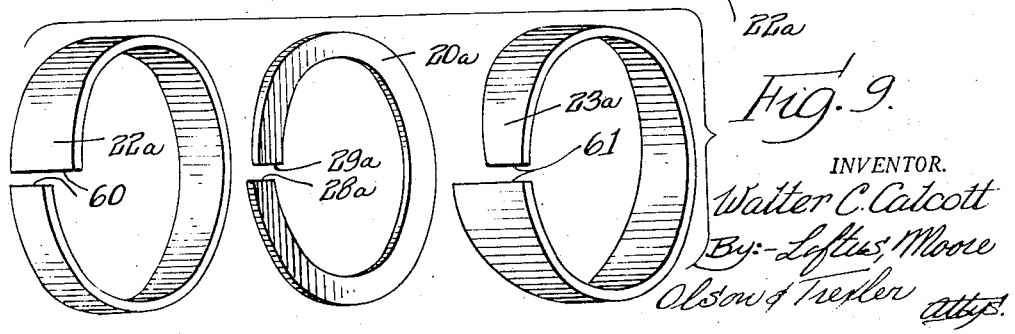
Fig. 9 is a detail illustrative view showing the members of Fig. 8, after they have been shaped into annular or ring-like form.

Referring to Figs. 8 and 9, a modified arrangement is illustrated for forming the anchor members engageable with the interlocking ring. In this instance the anchor members are shown as being formed from initially flat sheet metal strips 22a and 23a. After stamping or otherwise cutting the strips into suitable size and shape, as illustrated in Fig. 8, they are shaped into annular form, as shown in Fig. 9, whereby to form the annular sleeve-like anchor members, similar in function and purpose to the anchor members 22 and 23 previously described. When in assembled position, the slit or end portions 60 and 61 of the anchor members will be aligned with the slit or end portions 28a and 29a of the interlocking ring, as will be readily understood.

Figure 5:
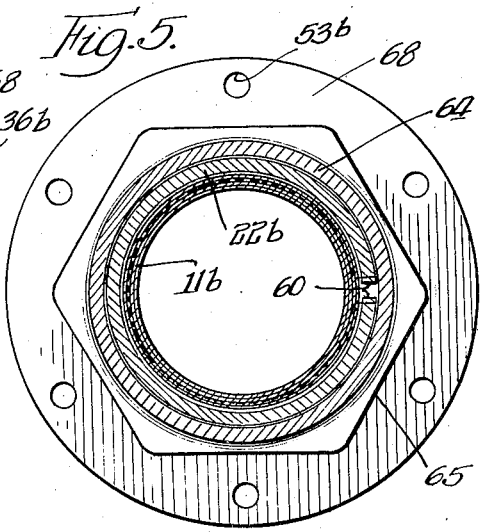
Fig. 5 is a transverse sectional view of the structure of Fig. 4 on the line 5—5 thereof.

In Figs. 4 and 5 a modified embodiment of the invention is illustrated, which may be preferably used for smaller size installations, as compared with the embodiment of Fig. 2, which may for example be preferably used with larger installations.

Referring to the structure of Figs. 4 and 5, the anchor members 22b and 23b, adapted to engage the opposite faces of the interlocking ring 20b, are illustrated as being of the type shown in Figs. 8 and 9, formed from initially flat elongated strips. It is to be understood, however, that continuous annular anchor members, as shown in Fig. 2, may be interchangeably used, if desired. In this structure the auxiliary coupling body member, as shown at 32b, is provided with an elongated axial skirt portion 64, serving the function and purpose of the cylindrical sleeve member 40 in the embodiment of Fig. 2. This axial skirt portion is provided on its enlarged end 65 with an internal threaded bore adapted for threaded engagement with an axially extending flange portion 66 formed on the main coupling body member 36b. A packing member, as shown at 67, may be clamped between the end face of the skirt portion 65 and the radially extending flange portion 68 of the main body member, whereby to provide a fluid-tight joint between the threaded parts. To facilitate threaded adjustment of the main and auxiliary body members, the enlarged skirt portion of the latter may be polygonally shaped as best shown in Fig. 5. An elongated packing 33b, similar in structure and purpose to the packing 33 previously described in reference to the embodiment of Fig. 2, is clamped between the inwardly directed flange portion 69 of the auxiliary body member and the anchor member 22b, as will be understood.

It is believed that the manner of operation of the structure of Figs. 4 and 5 will be clear from what has heretofore been said in reference to Fig. 2. As stated, the structure of Figs. 4 and 5, and the threaded connection provided, may be preferable for use with hose installations of smaller sizes.

Figure 6:
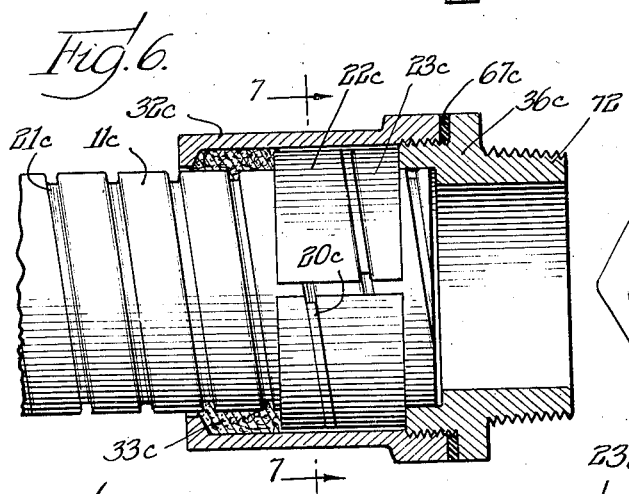
Fig. 6 is a view similar to Fig. 4, but illustrating a further modified form of coupling structure.
Figure 7:
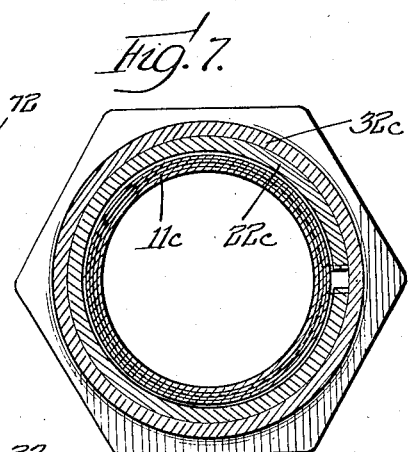
Fig. 7 is a transverse sectional view of the structure of Fig. 6, on the line 7—7 thereof.

In Figs. 6 and 7 an embodiment is illustrated generally similar to that shown in Figs. 4 and 5, except that in this instance the main coupling body member 36c, instead of being provided with a radially extending flange, such as shown at 68 in Figs. 4 and 5, and associated bolt holes, is provided with an axially extending threaded portion 72, adapted for co-mating threaded engagement with a suitable end fitting or the like. It thus will be seen that the main coupling body member may be variously shaped and arranged, in accordance with the requirements of any particular installation.

It is obvious that various changes may be made in the specific embodiments set forth for the purposes of illustration without departing from the spirit of the invention. The invention is accordingly not to be limited to the specific embodiments shown and described, but only as indicated in the following claims.

The invention is hereby claimed as follows:

1. A coupling structure for hose of the metal convoluted type, said coupling comprising a split ring interlocking member adapted to embrace the hose and mechanically interlock with the convolutions thereof, an anchor member slidably embracing the hose and adapted to engage the interlocking member and be held in place thereby, and a coupling body member retained on the hose by the anchor member.

2. A coupling structure for hose of the spiral convoluted type, said coupling comprising a member having a helical ring-like portion adapted to embrace the hose and mechanically interlock with the spiral convolutions thereof, an anchor member slidably embracing the hose and having a helical surface adapted to engage and co-mate with the interlocking member and be held in place thereby, and a coupling body member retained on the hose by the anchor member.

3. A coupling structure for hose of the metal convoluted type, said coupling comprising a split ring interlocking member adapted to embrace the hose and mechanically interlock with the convolutions thereof, an annular packing adapted to grip the external surface of the hose, and a coupling body member cooperable with the packing, said body member and packing being retained on the hose by the interlocking member.

4. A coupling structure for hose of the spiral convoluted type, said coupling comprising an interlocking member having a helical split ring portion adapted to embrace the hose and mechanically interlock with the convolutions thereof, an annular packing member adapted to grip the external surface of the hose, and a coupling body member cooperable therewith, said body member and packing being retained on the hose by the interlocking member.

5. A coupling structure for hose of the metal convoluted type, said coupling comprising an interlocking member adapted to engage the hose and mechanically interlock with the convolutions thereof, a pair of anchor members slidably engageable with the hose and adapted to abut the opposite sides of the interlocking member and be held in place thereby, a packing for sealing the hose, and a coupling body structure cooperable therewith and with the anchor members.

6. A coupling structure for hose of the metal convoluted type, said coupling comprising a split ring interlocking member adapted to embrace the hose and mechanically interlock with the convolutions thereof, a pair of annular anchor members slidably engageable with the hose and adapted to abut the opposite sides of the interlocking member and be held in place thereby, an annular packing member, and a coupling body structure for holding the packing member and anchor members in operative juxtaposition.

7. A coupling structure for hose of the spiral convoluted type, said coupling comprising a helical ring-like interlocking member adapted to embrace the hose and mechanically interlock with the spiral convolutions thereof, a pair of annular anchor members slidably engageable with the hose and adapted to abut the opposite sides of the interlocking member and be held in place thereby, an annular packing member engageable with the external surface of the hose, a pair of coupling body members disposed on opposite sides of the packing and anchor members, and means for urging the body members relatively toward each other to clamp the packing and anchor members in position on the hose.

8. A coupling structure as defined in claim 7, wherein said urging means comprises a series of bolts connecting the body members and disposed in circumferentially spaced relation thereon.

9. A coupling structure as defined in claim 7, wherein said urging means comprises a pair of co-mating annular threaded portions on the body members.

10. A coupling structure for hose of the metal convoluted type, said coupling comprising an interlocking member adapted to engage the hose and mechanically interlock with the convolutions thereof, an anchor member slidably engageable with the hose and having a surface complementary to and directly engaging the interlocking member to be held in place thereby, a packing engageable with the exterior surface of the hose, and a coupling body member, said anchor member and body member being cooperable with the packing to effect the compression thereof onto the hose, and said anchor member, body member, and packing being retained on the hose by the interlocking member.

11. A coupling structure for a hose of the spiral convoluted type, said coupling comprising a packing in sleeve-like form adapted to embrace the external surface of the hose, an interlocking member having a helical portion adapted to embrace and mechanically interlock with the spiral convolutions of the hose, and an anchor member slidably engageable with the hose and disposed on the hose between the interlocking member and the packing, said anchor member having a helical portion cooperable with the interlocking member and an annular portion cooperable with the packing, and said interlocking member and anchor member serving to hold the packing on the hose in spaced relation from the hose end.

12. A coupling structure as defined in claim 11, wherein said sleeve-like packing member has a length greater than the pitch of the hose.

13. A coupling structure for a hose of the spiral convoluted type, said coupling comprising a packing in sleeve-like form adapted to embrace the external surface of the hose, and a relatively flat helical ring interlocking member for holding the packing on the hose and in spaced relation from the hose end, said interlocking member having a helical portion adapted to embrace and mechanically interlock with the spiral convolutions of the hose.

14. A coupling structure as defined in claim 7, wherein each of said anchor members is provided with a circular surface along one edge portion and a helical surface along its other edge portion complementary to the helical interlocking member.

WALTER C. CALCOTT.

REFERENCES CITED

The following references are of record in the file of this patent:

UNITED STATES PATENTS

| Number | Name | Date |
| --- | --- | --- |
| 735,735 | Feust et al. | Aug. 11, 1903 |

FOREIGN PATENTS

| Number | Country | Date |
| --- | --- | --- |
| 14,161 | Great Britain | 1912 |
| 16,286 | Great Britain | 1908 |
| 17,350 | Great Britain | 1914 |